Dec. 21, 1965     TATSUYA ICHIHARA     3,224,271

MASS FLOW METER USING DIFFERENCE BETWEEN TORQUES

Filed June 12, 1962

INVENTOR.
TATSUYA ICHIHARA

BY

*Arthur H. Swanson*

ATTORNEY.

United States Patent Office 3,224,271
Patented Dec. 21, 1965

3,224,271
MASS FLOW METER USING DIFFERENCE BETWEEN TORQUES
Tatsuya Ichihara, Tokyo, Japan, assignor to Honeywell Inc., a corporation of Delaware
Filed June 12, 1962, Ser. No. 201,945
Claims priority, application Japan, June 12, 1961, 36/20,270
2 Claims. (Cl. 73—229)

This invention relates to a mass flow meter, and more particularly this invention is directed to a mass flow meter which detects and measures a fluid having mass $m$ and flow velocity $v$ in the form represented by mass flow $mv$. The mass flow of a fluid is obtained in the mass flow meter provided in accordance with this invention in the following way: a pair of vanes is provided on each wall of a channel which feeds a fluid to be measured, one of said vanes rotates upstream of said fluid opposing the direction of the flow of the fluid, the other of said vanes rotates downstream of said fluid following the direction of the flow of the fluid, and thereafter the difference between torques generated by each of said pair of vanes is detected and measured to determine the mass flow of the fluid.

It is an object of this invention to provide a mass flow meter in which the mass flow of a fluid is obtained in the form of the product of mass $m$ and flow velocity $v$.

It is another object of this invention to provide a mass flow meter in which the difference between torques generated by a pair of vanes each provided in a channel feeding a fluid to be measured is detected and measured so that the mass flow of the fluid is determined, one of said vanes rotating upstream of said fluid flow and the other downstream.

Figure 1:
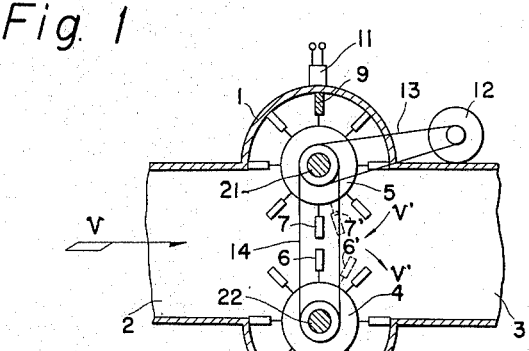
Figure 3:
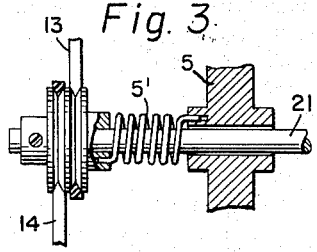
Figure 2:
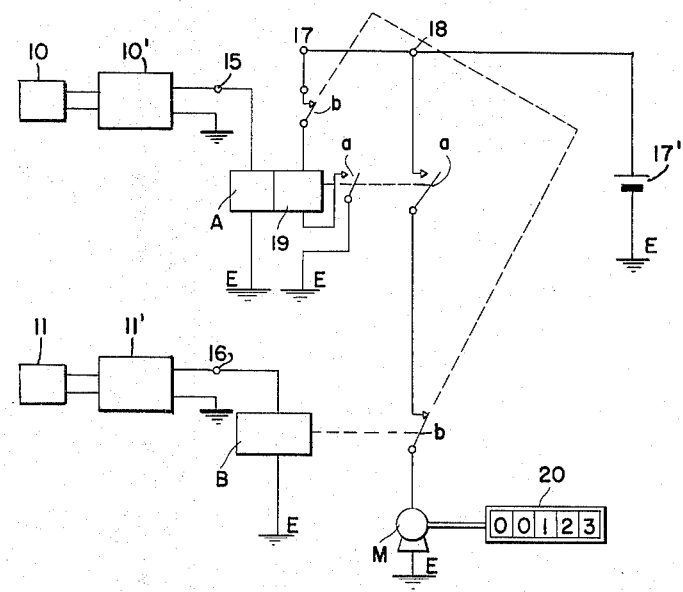

These objects will become apparent when full consideration is undertaken of the present specification and the drawings, in which FIG. 1 is a skeleton diagram explaining an embodiment of the mass flow meter provided according to this invention, FIG. 2 is a connection diagram of the relay assembly utilized in the mass flow meter shown in FIG. 1, and FIG. 3 is a diagram of a portion of the mass flow meter shown in FIG. 1, showing one of the torsion springs thereof.

In FIG. 1 and FIG. 2, a pair of casings 1 is provided between inlet conduit 2 which introduces a fluid to be measured and outlet conduit 3 which sends out the fluid. Vanes 4 and 5 are rotatably mounted in the center of each casing 1, and vane 4 provides a plurality of blades 6 on its periphery, and vane 5 blades 7, respectively. Axis 21 of vane 5 is driven by means of a constant speed motor 12 through belt 13 which connects axis 21 and motor 12, and axis 22 of vane 4 is driven by means of axis 21 through belt 14 which connects the two axes. Vane 5 rotates clockwise, opposing the fluid flow, and vane 4 also rotates clockwise, following the fluid flow. Permanent magnets 8 and 9 are mounted on the blades of vanes 4 and 5, respectively, and sending coils 10 and 11 are fixed outside of casings 1 and cooperate with permanent magnets 8 and 9, respectively. The output of sending coils 10 and 11 are, after being amplified by respective amplifiers 10' and 11' applied to input terminals 15 and 16 of operating coils A and B, respectively, as shown in FIG. 2. When operating coil A is energized by means of a pulse coming from sending coil 10, normally open contacts of switch "$a$" close, while when operating coil B is energized by means of a pulse coming from sending coil 11, normally closed contacts of switch "$b$" open. Terminal 17 is connected to an electrical source, shown as a battery 17' having its other terminal grounded at E, for supplying current to the self holding coil 19, and terminal 18 is connected to said electrical source 17 for supplying current to counter motor M. The other terminal of counter motor M is grounded at E, and counter 20 is coupled to counter motor M. Self holding coil 19 cooperates with operating coil A.

The operation of the mass flow meter provided in accordance with this invention is explained as follows:

Assuming that a fluid, the mass flow thereof to be measured, is introduced from inlet conduit 2 to outlet conduit 3 under a flow velocity $v$ and blades 6 rotate clockwise at a constant velocity $u$ following the fluid flow, and blades 7 also rotate clockwise at the same constant velocity $u$ opposing the fluid flow, the torque $T_{21}$ generated on axis 21 differs from the torque $T_{22}$ generated on axis 22, and the difference between the two torques is represented by the following formula:

$$T_{21}-T_{22}=m\{(v-u)^2-(v+u)^2\}$$
$$=-4muv=Kmv$$

where $K$ is a constant.

The product $mv$, the mass flow of the fluid, is represented by the difference between the two torques and determined by detecting the delay occurring in one of the two vanes with respect to the other vane by means of a suitable torsion spring, as shown in FIG. 3. While this figure illustrates only the torsion spring 5' associated with the vane 5 and its axis 21, there is a similar torsion spring associated with the vane 4 and its axis 22. In FIG. 1, if the blade marked number 6 displaces to a position marked number 6' and also the blade marked number 7 displaces to a position marked number 7', the difference between the two displacements is represented by the time difference between the two permanent magnets 8 and 9 each passing through a reference point (such as a position of each of sending coils 10 and 11 in FIG. 1). The time difference can be detected and measured by a relay circuit such as is shown in FIG. 2. A pulse is sent from sending coil 10 or 11 every time when permanent magnet 8 or 9 passes through sending coil 10 or 11, and the pulse is amplified to be applied to operating coil A or B. Switches "$a$" are closed by the pulse coming from sending coil 10 and switches "$b$" opened by the pulse coming from sending coil 11, and the time from the closing of switches "$a$" to the opening of switches "$b$" is counted by counter 20 to indicate the mass flow of the fluid being measured.

Further, the mass flow meter provided in accordance with this invention has an advantage in that the error in the mass flow is automatically corrected when the velocity of the vanes varies somewhat under an influence due to a voltage drop. Assuming that the angular displacements of vanes 4 and 5 are represented by $\theta_{21}$ and $\theta_{22}$ respectively, the following formulae are obtained:

$$\theta_{21}=T_{21}\cdot k \qquad (1)$$
$$\theta_{22}=T_{22}\cdot k$$

where $k$ is a constant.

The difference $\theta x$ between angular displacements $\theta_{21}$ and $\theta_{22}$ is as given below $$\theta x=\theta_{21}-\theta_{22}$$
$$=k(T_{21}-T_{22})=4\,k'\,muv \qquad (2)$$

where $k'$ is a constant.

The time $tx$ required for passing through the difference $\theta x$ of the angular displacements is as given below when the angular velocity of the vane is represented by $\omega$.

$$tx = \theta/\omega$$
$$= 4k'muv/\omega \qquad (3)$$

As velocity $u$ of the vanes is the products of radius $r$ of the vanes and angular velocity $\omega$ of the vanes, that is $$u = r \cdot \omega \qquad (4)$$

From Formulae 3 and 4 the following is obtained:

$$tx = 4k'rmv \qquad (5)$$

Formula 5 verifies that passing through time $tx$ is not affected by the variation in the motor revolution because it is independent of velocity $u$ of the vanes.

It should be understood that the embodiment herewith shown and described is the form of the invention at present preferred, but the scope of the invention is not limited to the precise details of construction herein shown but is to be ascertained by reference to the appended claims.

What is claimed is:

1. A mass flow meter for a fluid flowing a long a path, comprising
   a pair of bladed vane members, each of which is mounted for rotation about an axis perpendicular to the direction of the flow of the fluid along the path,
   motor means for rotating both of said members about their axes at substantially the same speed,
   one of said members being only partially immersed in the fluid flowing along the path in such a manner that said blades of said one member which are in contact with the fluid flowing along the path move substantially in a direction following the flow of the fluid flowing along the path,
   the other of said members being only partially immersed in the fluid flowing along the path in such a manner that said blades of said other member which are in contact with the fluid flowing along the path move substantially in a direction opposing the flow of the fluid flowing along the path,
   and means for determining the difference between the torques required to rotate said members as a measure of the mass flow of the fluid.

2. Apparatus as specified in claim 1, wherein the path along which the fluid flows is defined by opposite walls, wherein said axes of said two members are parallel to each other, wherein said axis of one of said members is adjacent one of said walls, wherein said axis of the other said members is adjacent an opposite one of said walls, and wherein said motor means rotates both of said members in the same direction.

References Cited by the Examiner
UNITED STATES PATENTS

| | | | |
|---|---|---|---|
| 804,417 | 11/1905 | Lezgus | 73—229 |
| 2,721,478 | 10/1955 | Somerville | 73—194 |
| 2,800,022 | 7/1957 | Granberg | 73—231 |
| 2,943,487 | 7/1960 | Potter | 73—231 |

RICHARD C. QUEISSER, *Primary Examiner.*

ROBERT L. EVANS, *Examiner.*